United States Patent
Lim et al.

(10) Patent No.: US 10,795,454 B2
(45) Date of Patent: Oct. 6, 2020

(54) NAVIGATION DEVICE AND CALCULATION METHOD OF CORRELATION SEARCH WINDOW THEREOF

(71) Applicant: PixArt Imaging Inc., Hsin-Chu County (TW)

(72) Inventors: Kevin Len-Li Lim, Penang (MY); Rizal Bin Jaffar, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 60 days.

(21) Appl. No.: 16/152,663

(22) Filed: Oct. 5, 2018

(65) Prior Publication Data

US 2020/0110472 A1    Apr. 9, 2020

(51) Int. Cl.
*G06F 3/03* (2006.01)
*G06K 9/46* (2006.01)
*G06K 9/62* (2006.01)
*G06F 3/0354* (2013.01)

(52) U.S. Cl.
CPC ........ *G06F 3/0304* (2013.01); *G06F 3/03543* (2013.01); *G06K 9/4642* (2013.01); *G06K 9/6202* (2013.01)

(58) Field of Classification Search
CPC . G06F 3/0304; G06F 3/03543; G06K 9/4642; G06K 9/6202
See application file for complete search history.

(56) References Cited

U.S. PATENT DOCUMENTS

| | | | |
|---|---|---|---|
| 7,333,651 B1 * | 2/2008 | Kim | G06K 9/6202 382/154 |
| 2015/0086082 A1 * | 3/2015 | Teo | G06F 3/0317 382/107 |
| 2016/0054816 A1 * | 2/2016 | Lee | G01B 11/14 345/166 |
| 2016/0265969 A1 * | 9/2016 | Chen | G06F 3/0317 |

* cited by examiner

*Primary Examiner* — Ariel A Balaoing
(74) *Attorney, Agent, or Firm* — Hauptman Ham, LLP

(57) ABSTRACT

There is provided a navigation device including an image sensor and a processor. The image sensor outputs a reference frame and a comparison frame. The processor calculates a correlation search window by changing a relative position of the comparison frame with respect to the reference frame. The processor ignores a part of pixel data of the comparison frame without being processed while calculating each correlation value of the correlation search window to reduce total computation load.

18 Claims, 14 Drawing Sheets

5X5 correlation search window

| D1 | D2 | D3 | D4 | D5 |
|----|----|----|----|----|
| D6 | D7 | D8 | D9 | D10 |
| D11 | D12 | D13 | D14 | D15 |
| D16 | D17 | D18 | D19 | D20 |
| D21 | D22 | D23 | D24 | D25 |

— CSW4

— CSW4

5X5 correlation search window

| D1 | D2 | D3 | D4 | D5 |
|----|----|----|----|----|
| D6 | F1 | F2 | F3 | D7 |
| D8 | F4 | F5 | F6 | D9 |
| D10 | F7 | F8 | F9 | D11 |
| D12 | D13 | D14 | D15 | D16 |

— CSW5

— CSW5

NAVIGATION DEVICE AND CALCULATION METHOD OF CORRELATION SEARCH WINDOW THEREOF

BACKGROUND

1. Field of the Disclosure

This disclosure generally relates to a navigation device and, more particularly, to a navigation device that ignores a part of pixel data of an image frame in calculating a correlation search window to reduce the calculating power consumption and a calculation method of the correlation search window, wherein said correlation search window is for calculating displacement and subpixel motion.

2. Description of the Related Art

Although the touch panel has been broadly applied to human-machine interfaces, in some scenarios a navigation device is still necessary in order to conduct an interaction with an imaging display system.

In some types of navigation devices, an image sensor is adopted to acquire images, and the position tracking is performed by calculating a feature variation between images. However, a navigation device is preferably has a low power consumption, and each device element needs to reduce its consumed power in operation especially for a wireless navigation device. Nowadays, a high sampling rate is adopted in the navigation device to improve the accuracy such that a frequency of calculating the feature variation is increased at the same time to increase the total power consumption.

Accordingly, it is necessary to provide a navigation device that can reduce the consumption power of the device during the position tracking.

SUMMARY

The present disclosure provides a navigation device and a calculation method of a correlation search window thereof that ignore a part of pixel data of an image frame during calculating a correlation search window to reduce the consuming power in calculation.

The present disclosure further provides a navigation device that performs the position tracking by using a correlation search window calculated by image frames of different resolution.

The present disclosure further provides a navigation device and a calculation method of a correlation search window thereof that perform a second calculation on calculated correlation values of a correlation search window.

The present disclosure further provides a navigation device capable of calculating subpixel motion. When a calculated correlation peak is located at predetermined positions of a correlation search window, the navigation device projects some adjacent correlation values around the correlation peak from other adjacent correlation values by mirror reflection, and calculates the subpixel motion according to the correlation peak and adjacent correlation values thereof.

The present disclosure provides a navigation device including an image sensor and a processor. The image sensor is configured to output a reference frame and a comparison frame, wherein the comparison frame is a current frame, and the reference frame is an image frame outputted prior to the comparison frame. The processor is configured to calculate a correlation search window by changing a relative position of the comparison frame with respect to the reference frame, wherein the processor ignores a part of pixel data of the comparison frame in calculating each correlation value of the correlation search window.

The present disclosure further provides a navigation device including an image sensor and a processor. The image sensor is configured to output a reference frame and a comparison frame, wherein the comparison frame is a current frame, and the reference frame is an image frame outputted prior to the comparison frame. The processor is configured to calculate a 5×5 correlation search window by changing a relative position of the comparison frame with respect to the reference frame, wherein the processor does not ignore any pixel data of the comparison frame while calculating 9 inner correlation values of the correlation search window, but ignores a part of pixel data of the comparison frame while calculating 16 edge correlation values of the correlation search window.

The present disclosure further provides a calculation method of a correlation search window of a navigation device. The navigation device includes an image sensor, a memory and a processor. The calculation method includes the steps of: storing a reference frame in the memory; outputting, by the image sensor, a comparison frame; and calculating, by the processor, a correlation search window by changing a relative position of the comparison frame with respect to the reference frame, wherein the processor ignores a part of pixel data of the comparison frame in calculating at least a part of correlation values of the correlation search window.

In the navigation device and the calculation method of a correlation search window of the present disclosure, said ignoring is referred to that even though the image sensor is arranged to output pixel data of all pixels, the processor does not calculate pixel data of the ignored pixels during calculating correlation values using multiplication or subtraction, wherein, according to different applications, the pixel data of the ignored pixels is not stored in a memory or is still stored in the memory to be used in the following operation.

The navigation device of the present disclosure does not reduce the power consumption by turning off a part of pixels of an image sensor in capturing an image frame. A read circuit (e.g., correlated double sampling, CDS) still reads pixel data of all pixels of a pixel array, and the pixel data is sent to a processor. The processor ignores a part of pixel data of a comparison frame while calculating correlation values of a correlation search window.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The navigation device of the present disclosure is adapted to various devices such as an optical mouse, an optical finger navigator (OFN), an optical remote controller and an optical game tool that adopt an image sensor to capture image frames and calculate a correlation search window for tracking positions. Although the following embodiments are described by using an optical mouse as an example, a person skilled in the art would understand the operation applied to other types of the navigation device after understanding the descriptions below. Furthermore, it should be mentioned that in some applications of the navigation device, a light source is not necessary.

Figure 1:
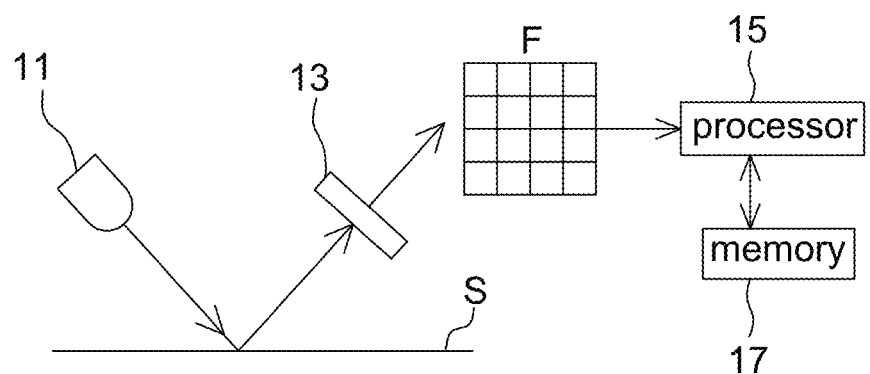
FIG. 1 is a schematic diagram of a navigation device according to one embodiment of the present disclosure.

Referring to FIG. 1, it is a schematic diagram of a navigation device 100 according to one embodiment of the present disclosure. The navigation device 100 includes a light source 11, an image sensor 13, a processor 15 and a memory 17. The navigation device 100 is used to perform a relative motion with respect to a work surface S, wherein said relative motion is implemented by the movement of at least one of the navigation device 100 and the work surface S. The light source 11 and the image sensor 13 are electrically coupled to the processor 15 to be controlled thereby. The processor 15 accesses data in the memory 17 while calculating displacement.

The light source 11 is, for example, a light emitting diode or a laser diode, and emits light of an identifiable spectrum to illuminate the work surface S, e.g., emitting red light and/or infrared light.

The image sensor 13 includes, for example, a CCD image sensor, a MOS image sensor or other light sensors, which has a plurality of pixels arranged in an array to sequentially acquire image frames F at a sampling rate corresponding to the lighting of the light source 11, and the acquired image frames F are sent to the processor 15 for post-processing. In the embodiment without the light source 11, the image sensor 13 captures ambient light bounces off a target and outputs image frames F at a predetermined frame rate.

The processor 15 is, for example, a digital signal processor (DSP), a micro controller unit (MCU) or an application specific integrated circuit (ASIC) that calculates, using predetermined software and/or hardware codes, displacement with respect to the work surface S according to the image frames F successively outputted by the image sensor 13. The calculated displacement may or may not include subpixel scale depending on the required calculation accuracy.

The memory 17 includes a non-volatile memory and/or a volatile memory, and used to permanently store the algorithm and parameters (e.g., the displacement threshold below, but not limited to) used in calculating displacement, and temporarily store pixel data of image frames F (e.g., reference frame and comparison frame) in operation of the navigation device 100.

Figure 2A:
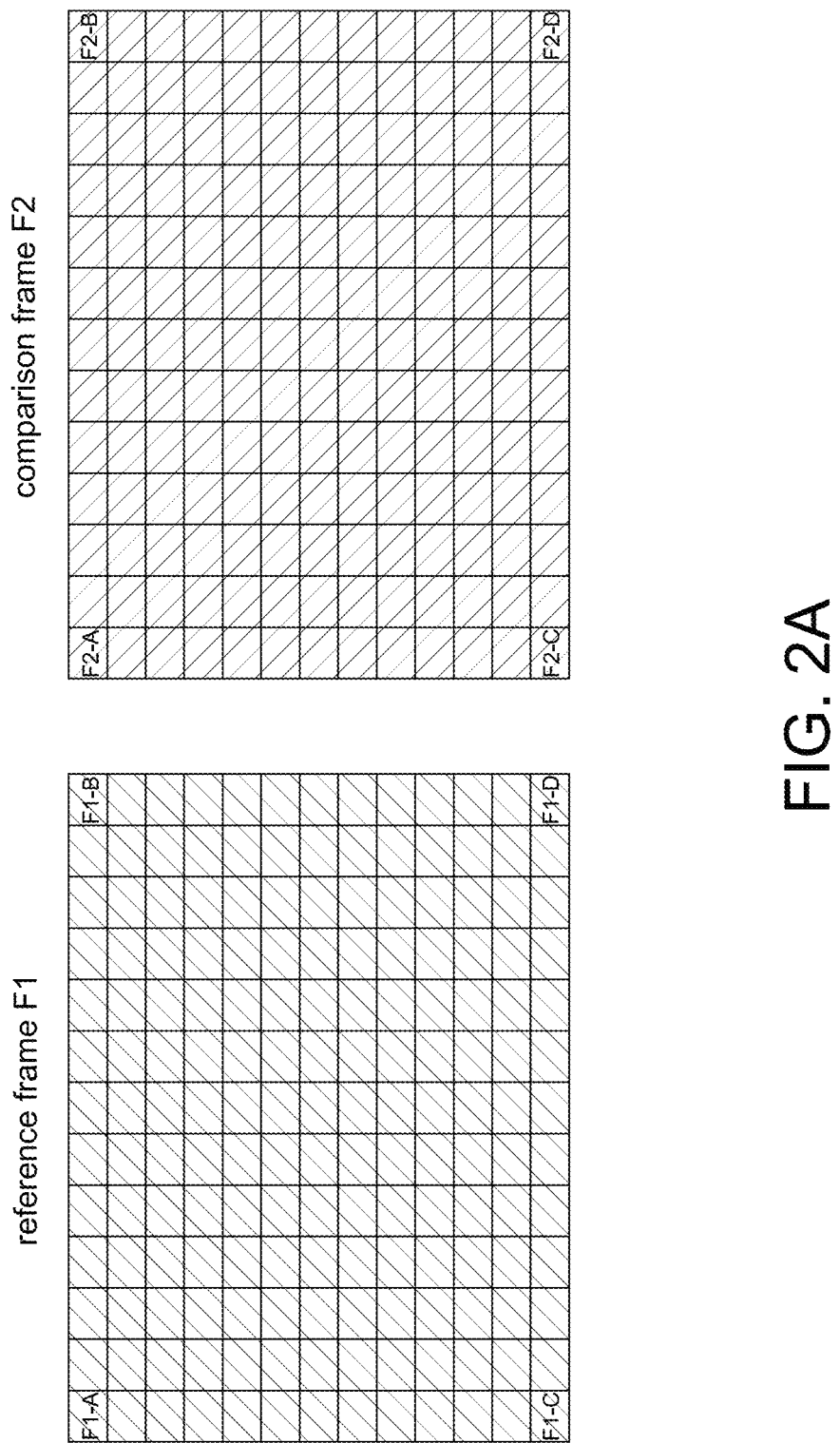
FIGS. 2A-2D are schematic diagrams of calculating a correlation search window using a navigation device according to a first embodiment of the present disclosure.
Figure 2B:
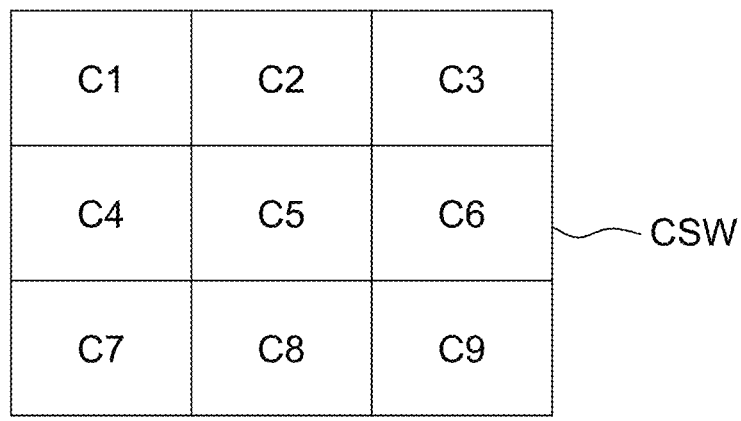

FIGS. 2A-2D are schematic diagrams of calculating a correlation search window using a navigation device 100 according to a first embodiment of the present disclosure. In this embodiment, the image sensor 13 sequentially outputs a reference frame F1 and a comparison frame F2 (e.g., separated by at least one sampling period), wherein the comparison frame F2 is a current frame and the reference frame F1 is an image frame outputted prior to the comparison frame F2 and has been stored in the memory 17. The processor 15 calculates a correlation search window CSW according to the reference frame F1 and the comparison frame F2, and calculates the displacement with respect to the work surface S according to the calculated CSW. In this embodiment, the correlation search window CSW is described by a 3×3 correlation value array (as shown in FIG. 2B) as an example.

Figure 2C:
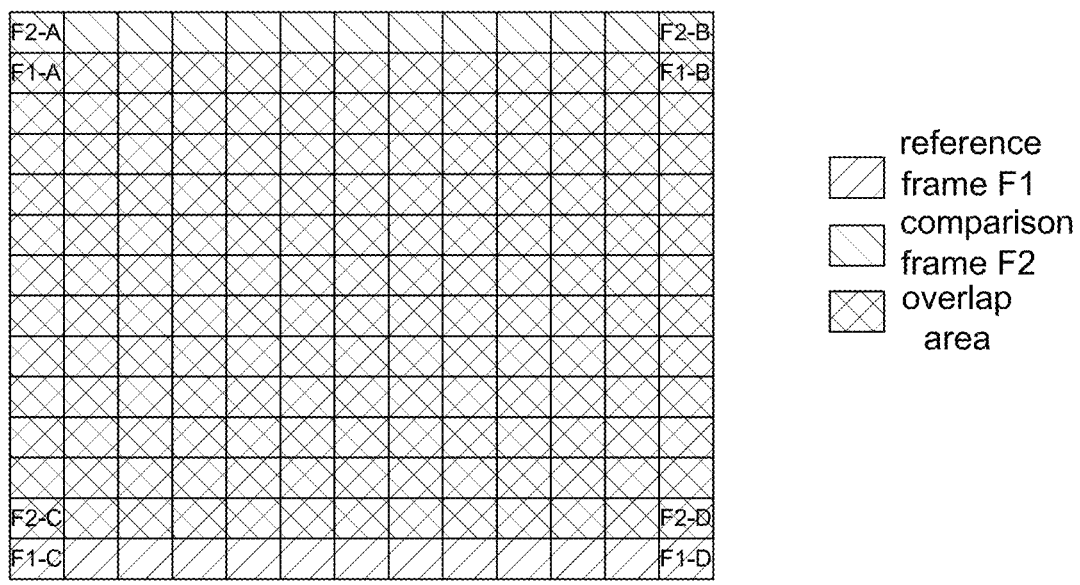
Figure 2D:
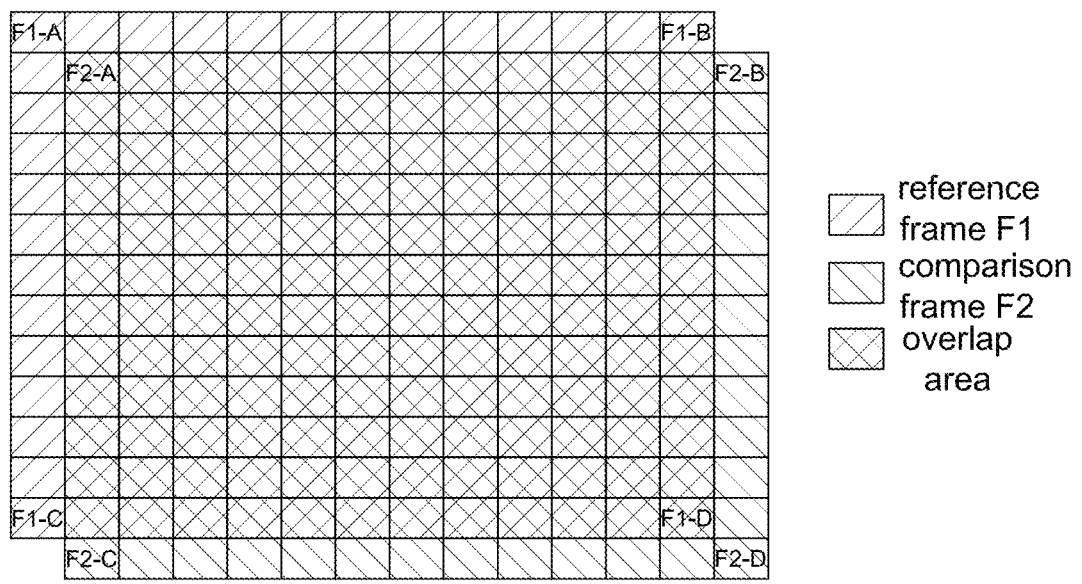

For example, the processor 15 calculates the correlation search window CSW by changing a relative position of the comparison frame F2 with respect to the reference frame F1, e.g., FIG. 2B showing that CSW includes 9 correlation values C1 to C9, wherein each correlation value C1 to C9 of CSW is a sum of multiplication or a sum of subtraction between corresponding pixels of the comparison frame F2 and the reference frame F1 at an associated relative position. In FIGS. 2A, 2C and 2D, F1-A to F1-D refer to four corner pixels of the reference frame F1, and F2-A to F2-D refer to four corner pixels of the comparison frame F2.

For example, for calculating the correlation value C5, the processor 15 fully overlaps the comparison frame F2 with the reference frame F1, and then respectively calculates a multiplication operation or a subtraction operation of corresponding pixel data in a pixel-by-pixel manner (e.g., a number of 13×13 operations), and then calculates a sum of 13×13 multiplication values or a sum of 13×13 subtraction values. The processor 15 takes the calculated sum of multiplication or sum of subtraction as the correlation value C5.

For example, for calculating the correlation value C2, the processor 15 moves the comparison frame F2 upward by one pixel with respect to the reference frame F1, as shown in FIG. 2C. The processor 15 then respectively calculates a multiplication operation or a subtraction operation of corresponding pixel data within an overlap area in a pixel-by-pixel manner (e.g., a number of 12×13 operations), and then calculates a sum of 12×13 multiplication values or a sum of 12×13 subtraction values. The processor 15 takes the calculated sum of multiplication or sum of subtraction as the correlation value C2. Depending on different applications, the non-overlapped pixels (e.g., those filled with lines slant in a single direction in FIG. 2C) are also multiplied or subtracted.

For example, for calculating the correlation value C9, the processor 15 moves the comparison frame F2 rightward and downward by one pixel with respect to the reference frame F1, as shown in FIG. 2D. The processor 15 then respectively calculates a multiplication operation or a subtraction operation of corresponding pixel data within an overlap area in a pixel-by-pixel manner (e.g., a number of 12×12 operations), and then calculates a sum of 12×12 multiplication values or a sum of 12×12 subtraction values. The processor 15 takes the calculated sum of multiplication or sum of subtraction as the correlation value C9. Similarly, depending on different applications, the non-overlapped pixels are also multiplied or subtracted.

Other correlation values C1, C3 to C4 and C6 to C8 are calculated similar to those of FIGS. 2C and 2D only relative positions between the comparison frame F2 and the reference frame F1 are different, and thus details of the calculation are not repeated herein. The 3×3 correlation value array includes 9 correlation values corresponding to 9 relative positions of the comparison frame F2 with respect to the reference frame F1. In a different application, the correlation search window is selected as a 5×5 correlation value array, and the processor 15 needs to calculate 25 correlation values. The 5×5 correlation value array includes 25 correlation values corresponding to 25 relative positions of the comparison frame F2 with respect to the reference frame F1.

Figure 3A:
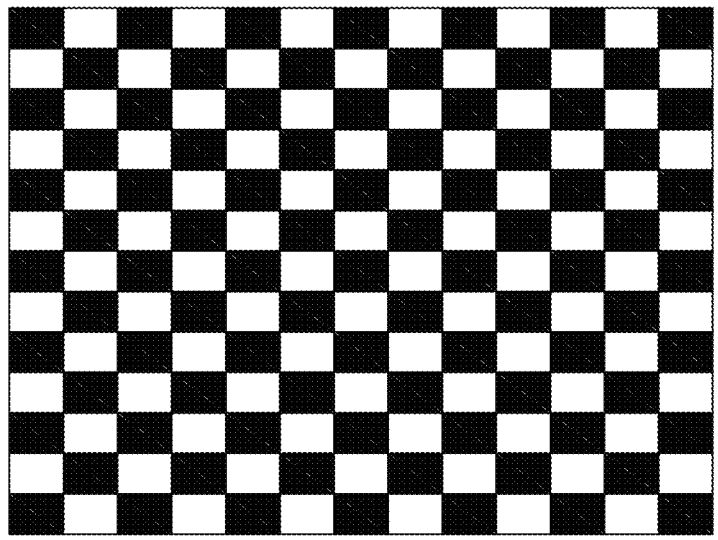
FIGS. 3A-3B are schematic diagrams of calculating a correlation search window using a navigation device according to a second embodiment of the present disclosure.
Figure 3B:
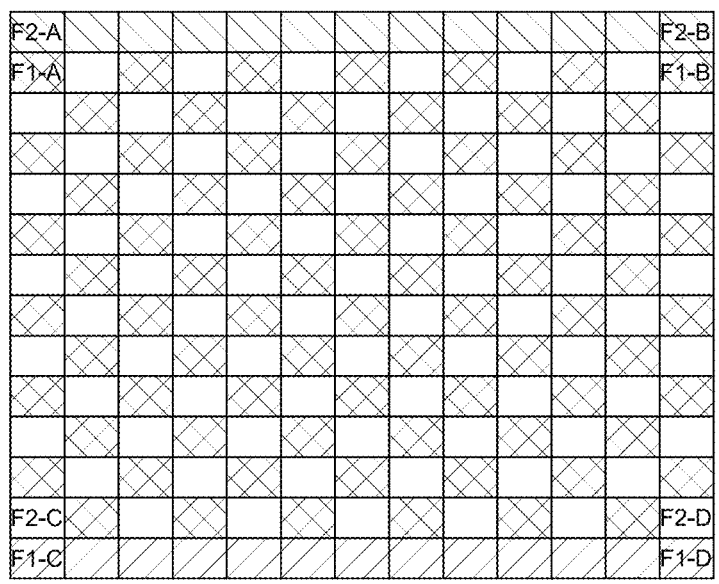

Referring to FIGS. 3A-3B, they are schematic diagrams of calculating a correlation search window using a navigation device according to a second embodiment of the present disclosure. To reduce computation load of calculating the correlation search window CSW, the processor 15 ignores a part of pixel data of the comparison frame F2 while calculating each correlation value (e.g., C1 to C9 in FIG. 2B) of CSW. In one non-limiting embodiment, the ignored pixel data (e.g., filled pixels in FIG. 3A) and the rest pixel data (e.g., blank pixels in FIG. 3A) in the comparison frame F2 are distributed as a chessboard pattern, but the present disclosure is not limited thereto as long as a part of pixel data of the comparison frame F2 is not calculated in calculating the sum of amplification or the sum of subtraction.

For example referring to FIG. 3B, it is a schematic diagram of calculating a correlation value C2 in the second embodiment, i.e. the comparison frame F2 moving 1-pixel upward with respect to the reference frame F1. In FIG. 3B, within an overlap area (not filled by lines slant in a single direction) of the reference frame F and the comparison frame F2, the blank pixel (not filled by any slant line) are not calculated. Accordingly, compared to FIG. 2C in which 12×13 times of operations (multiplication or subtraction) are needed to calculate the correlation value C2 due to the full-resolution (no pixel data being ignored) comparison frame F2 being used, FIG. 3B only needs about a half of computation for obtaining the correlation value C2 such that the power consumption in calculation is effectively reduced.

Similarly, in calculating other correlation values C1 and C3 to C9 in FIG. 2B by the second embodiment, the processor F2 ignores a part of pixel data of the comparison frame F2 to effectively reduce the power consumption during calculation.

Referring to FIGS. 4A to 4D, they are schematic diagrams of calculating a correlation search window using a navigation device according to a third embodiment of the present disclosure. In this embodiment, the processor 15 changes the relative position of the comparison frame F2 with respect to the reference frame F1 in upward/downward/leftward/rightward directions (by one and two pixels) in a way similar to those shown in FIGS. 2C and 2D to obtain correlation values of D1 to D25 of a correlation search window CSW4; for example, moving the comparison frame F2 leftward and upward with respect to the reference frame F1 by 2 pixels to obtain the correlation value D1, moving the comparison frame F2 upward with respect to the reference frame F1 by 2 pixels to obtain the correlation value D3, and so on. The processor 15 then calculates a correlation peak (i.e. maximum correlation value) of the correlation search window CSW4, and calculates displacement according to the correlation peak.

Figures 4A, 4B:
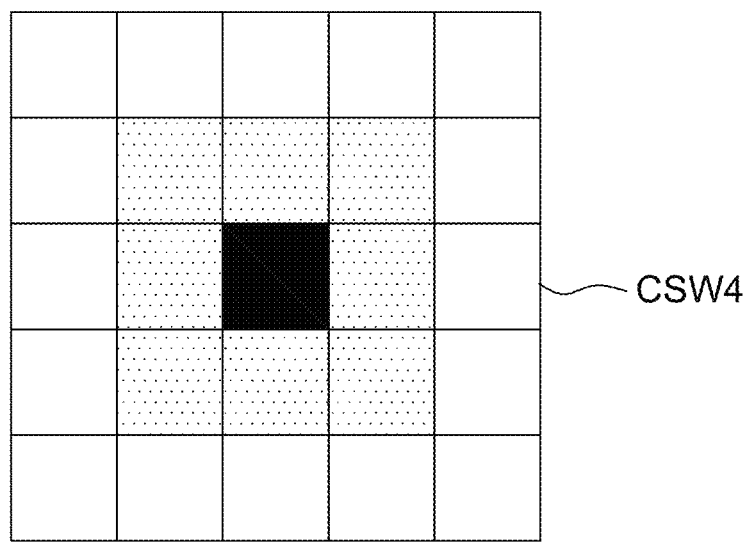
FIGS. 4A-4D are schematic diagrams of calculating a correlation search window using a navigation device according to a third embodiment of the present disclosure.
Figure 4C:
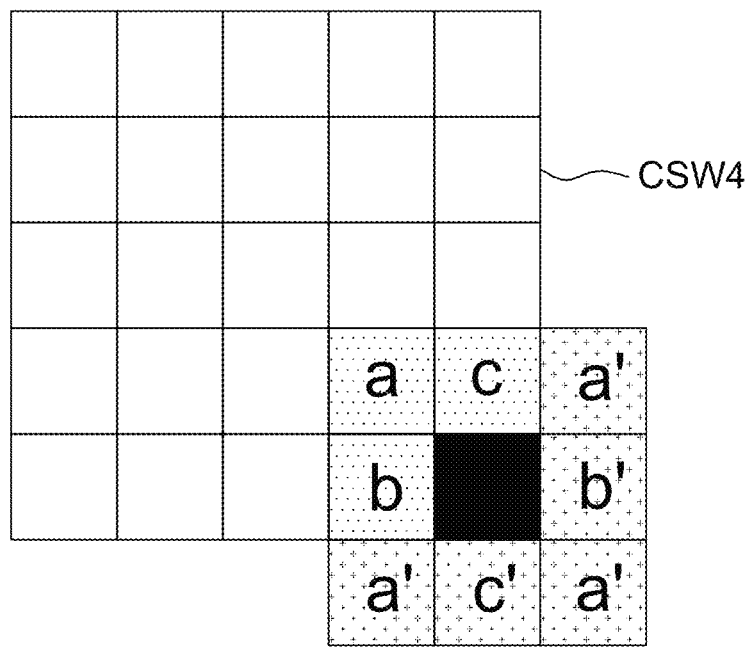
Figure 4D:
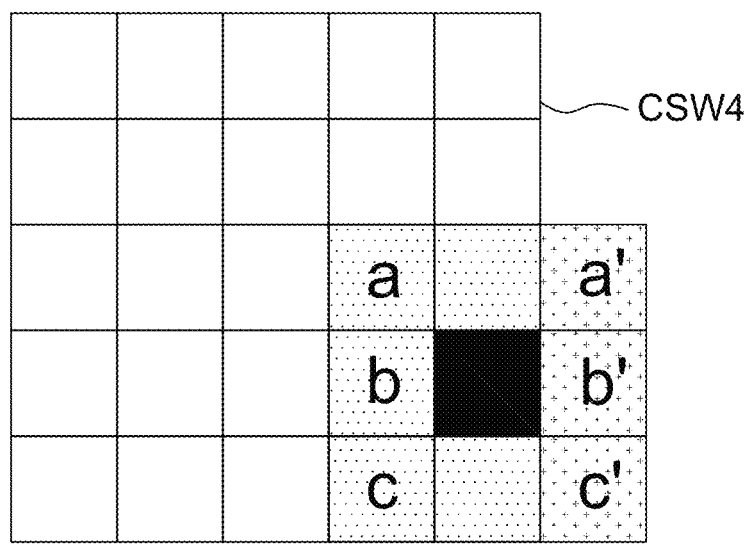

For example in an embodiment without using a peak prediction algorithm (for predicting a position of a correlation peak), when the correlation peak is at a center of CSW4 (as shown in FIG. 4B), it means that the displacement is 0. When the correlation peak is at a lower-right corner of CSW4 (as shown in FIG. 4C), it means that the displacement is 2 pixels rightward and 2 pixels downward. When the correlation peak is at a position of CSW4 as shown in FIG. 4D, it means that the displacement is 2 pixels rightward and 1 pixel downward. In this case subpixel motion is not considered, and thus a position change of only the correlation peak is considered.

When the subpixel motion is considered, the processor 15 calculates the subpixel motion according to the correlation peak and adjacent correlation pixels thereof. For example referring to FIG. 4B again, it is assumed that the correlation peak (black position) is located at a center position of CSW4, and there are 8 adjacent correlation pixels (filled with dots) surrounding the correlation peak. As in this stage the correlation peak and the 8 adjacent correlation values are calculated using the partial-resolution comparison frame F2 (i.e. ignoring partial pixel data as shown in FIGS. 3A to 3B), to increase the position accuracy, the processor 15 further calculates (for the second time) full-resolution (referred to no ignored pixel data) correlation values of the correlation peak and the 8 adjacent correlation values, respectively, according to the comparison frame F2 without ignoring pixel data (as shown in FIGS. 2C and 2D) and the reference frame F1. The processor 15 calculates the subpixel motion according to the full-resolution correlation peak and the full-resolution adjacent correlation values.

However, while calculating the full-resolution correlation values for the second time, the processor 15 does not need to readback the full 13×13 comparison frame F2 again. As an example, referring to a center position D13 in CSW4 of FIG. 4A, the first partial-resolution calculation result already contains a sum of products of 84 pixels of F2 (out of the 13×13 total pixels or 169 pixels of F2). Let's call the first partial-resolution calculation result as P1. For the second full-resolution calculation, the processor 15 only needs to retrieve the rest 85 pixels of F2 from the memory 17 that are skipped in the first partial-resolution calculation and calculates the remaining sum of products on the 85 pixels. Let's call the result of the sum of products of the rest 85 pixels as P2. So the full-resolution calculation result for D13=P1+P2. The full-resolution calculations for the 8 adjacent correlation values surrounding D13 is similar. The 85 pixels of F2 that are retrieved from the memory 17 previously is shifted by the processor 15 in all 8 directions to get their remaining sum of products which is then added to their first partial-resolution calculation result.

The subpixel motion is calculated by, for example, using value weightings of the correlation peak and the maximum adjacent correlation value (or including the second maximum adjacent correlation value) among the 8 adjacent correlation values. Therefore, if the subpixel motion is not calculated, FIG. 4B indicates no displacement. However, if the subpixel motion is considered, FIG. 4B indicates non-zero displacement, and the motion is toward a direction of the maximum adjacent correlation value from the correlation peak and smaller than one-pixel distance.

In addition, when the correlation peak is at an edge position of the correlation search window CSW4 such as a corner position shown in FIG. 4C, the processor 15 also calculates full-resolution correlation values of the correlation peak and the adjacent correlation values within CSW4 (e.g., three adjacent correlation values a, b and c herein) according to the comparison frame F2 without ignoring pixel data and the reference frame F1. As for the adjacent correlation values outside CSW4 (e.g., a', b' and c' herein), the processor 15 does not calculate the sum of multiplication or subtraction of corresponding pixel data but mirror projects the full-resolution correlation values of the adjacent correlation values (e.g., a, b and c herein) within the correlation search window CSW4 as a part of adjacent correlation values (e.g., a', b' and c' herein), which are outside the correlation search window CSW4, of the correlation peak. For example, a'=a, b'=b and c'=c. Finally, the processor 15 calculates the subpixel motion according to value weightings of the correlation peak and adjacent correlation values (e.g., a, b, c and a', b', c' herein). The calculation in FIG. 4D is similar to FIG. 4C, i.e. the processor 15 calculating full-resolution correlation values of the correlation peak (black position) and inner adjacent correlation values (dotted positions), and then mirror projecting outer adjacent correlation values from the inner adjacent correlation values, and thus details thereof are not repeated herein.

Referring to FIGS. 5A to 5G they are schematic diagrams of calculating a correlation search window using a navigation device according to a fourth embodiment of the present disclosure. In this embodiment, the processor 15 also changes the relative position of the comparison frame F2 with respect to the reference frame F1 to calculate a 5×5 correlation search window CSW5. Different from the above third embodiment, in this embodiment the processor 15 does not ignore any pixel data of the comparison frame F2 while calculating 9 inner correlation values (e.g., F1 to F9) of the correlation search window CSW5, i.e., calculating the inner correlation values F1 to F9 by 9 relative positions using a full-resolution comparison frame F2 and a reference frame F1. However, the processor 15 ignores a part of pixel data of the comparison frame F2 while calculating 16 edge correlation values (e.g., D1 to D16) of the correlation search window CSW5, i.e. calculating the edge correlation values D1 to D16 by 16 relative positions using a partial-resolution comparison frame F2 and the reference frame F1. Accordingly, the computation load is effectively reduced in calculating the edge correlation values.

Similarly, after the 5×5 correlation search window CSW5 is obtained, the processor 15 calculates a correlation peak of CSW5. If it is not necessary to calculate subpixel motion, the displacement is calculated directly according to a position of the correlation peak. For example, in the case without using the peak prediction algorithm, FIG. 5B indicates no displacement, FIG. 5C indicates 1 pixel rightward and 1 pixel downward motion, FIG. 5D indicates 1 pixel rightward motion, FIG. 5E indicates 2 pixels rightward and 2 pixels downward motion, FIG. 5F indicates 2 pixels rightward and 1 pixel downward motion, and FIG. 5G indicates 2 pixels rightward motion.

If it is desired to calculate subpixel motion, the processor 15 also calculates the subpixel motion according to a correlation peak and 8 adjacent correlation values thereof in CSW5.

For example, when the correlation peak is at a position of the edge correlation values (e.g., shown in FIGS. 5E and 5G) of the correlation search window CSW5, the processor 15 further calculates full-resolution correlation values of the correlation peak (e.g., black position in FIGS. 5E-5G) and the adjacent correlation values (e.g., positions filled with small dots in FIGS. 5E-5G) within CSW5, respectively, according to the comparison frame F2 without ignoring pixel data (e.g., shown in FIGS. 2C and 2D) and the reference frame F1 because these correlation values were calculated using a partial-resolution comparison frame F2.

Next, the processor 15 further mirror projects the full-resolution correlation values of the adjacent correlation values within the correlation search window CSW5 (e.g., a, b and c herein) as a part of adjacent correlation values (e.g., a', b' and c' herein), which are outside the correlation search window CSW5, of the correlation peak. For example, a'=a, b'=b and c'=c. Finally, the processor 15 calculates the subpixel motion according to value weightings of the correlation peak and adjacent correlation values thereof (e.g., a, b, c and a', b' and c' herein).

Figures 5A, 5B:
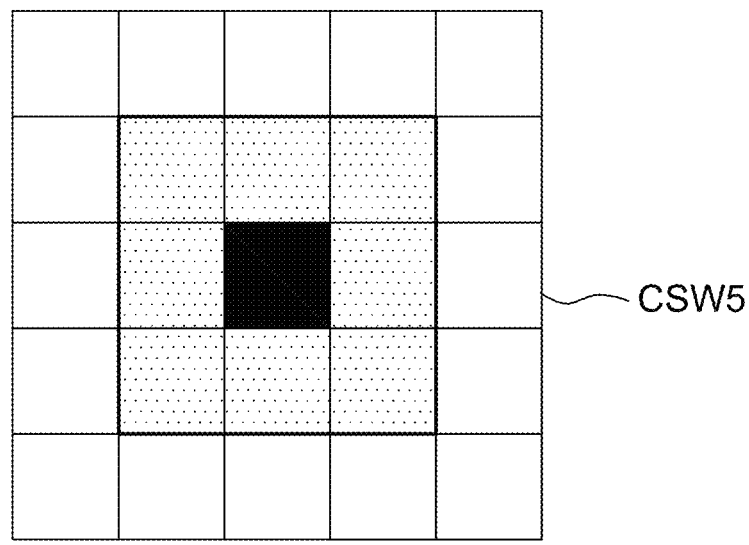
FIGS. 5A-5G are schematic diagrams of calculating a correlation search window using a navigation device according to a fourth embodiment of the present disclosure.
Figure 5C:
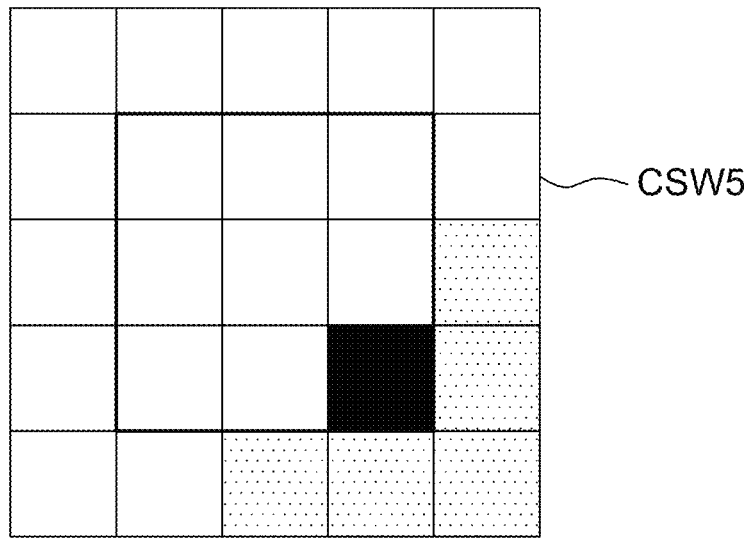
Figure 5D:
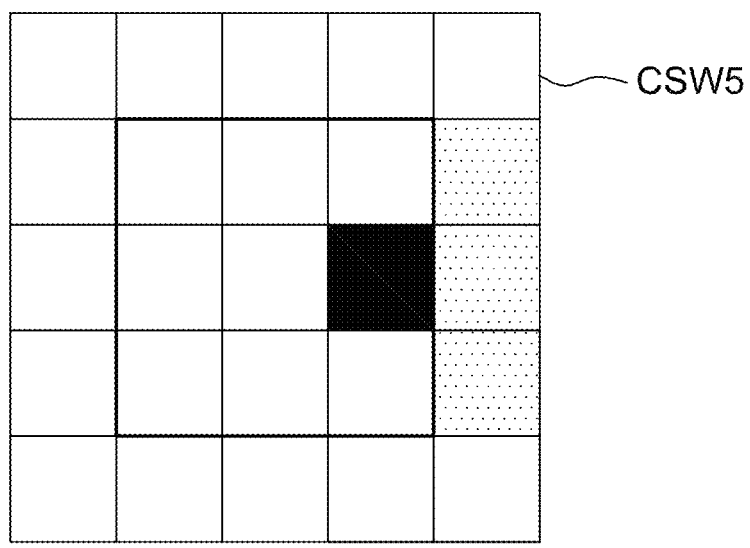
Figure 5E:
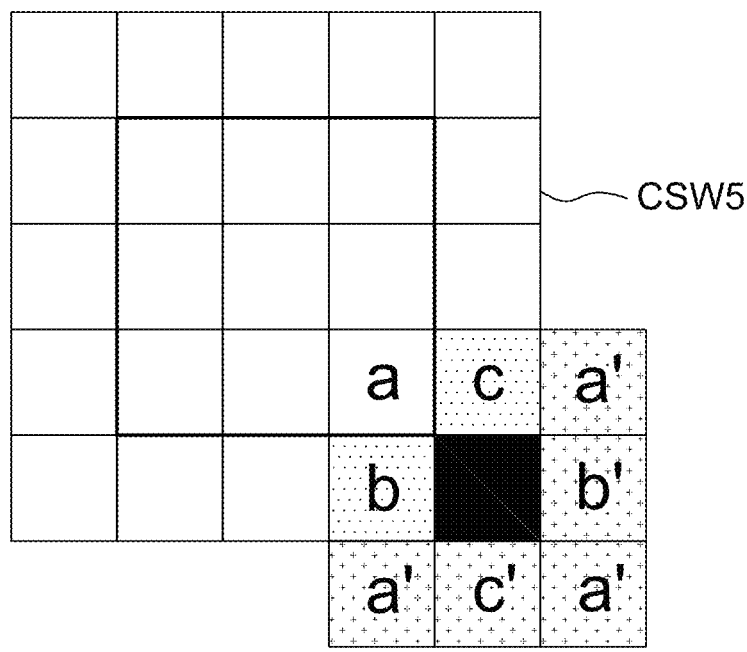
Figure 5F:
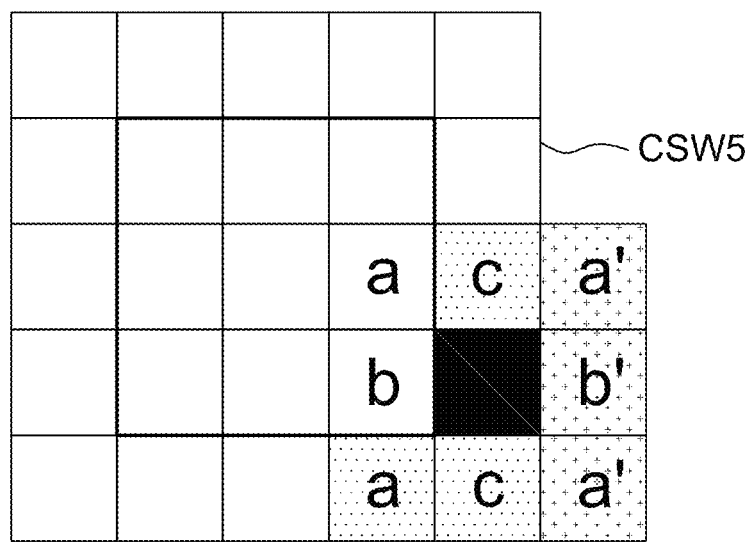
Figure 5G:
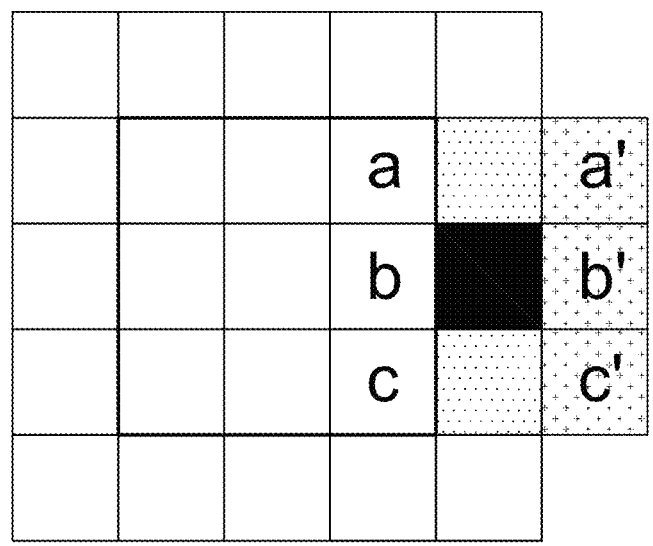

In addition, when the correlation peak is at a position of the inner correlation values of the correlation search window CSW5 but not at a center position (e.g., as shown in FIGS. 5C and 5D), the processor 15 further calculates full-resolution correlation values of the adjacent correlation values at positions of the edge correlation values (e.g., positions filled with small dots in FIGS. 5C-5D), respectively, according to the comparison frame F2 without ignoring pixel data (e.g., as shown in FIGS. 2C and 2D) and the reference frame F1 because these correlation values were calculated using a partial-resolution comparison frame F2. Finally, the processor 15 calculates the subpixel motion according to value weightings of the correlation peak and adjacent correlation values thereof.

In some embodiments, the present disclosure further predicts the correlation peak in conjunction with a peak prediction algorithm. The final displacement is equal to the predicted displacement plus the displacement (non-subpixel motion or subpixel motion) calculated by using the correlation search window as mentioned above.

Figure 7:
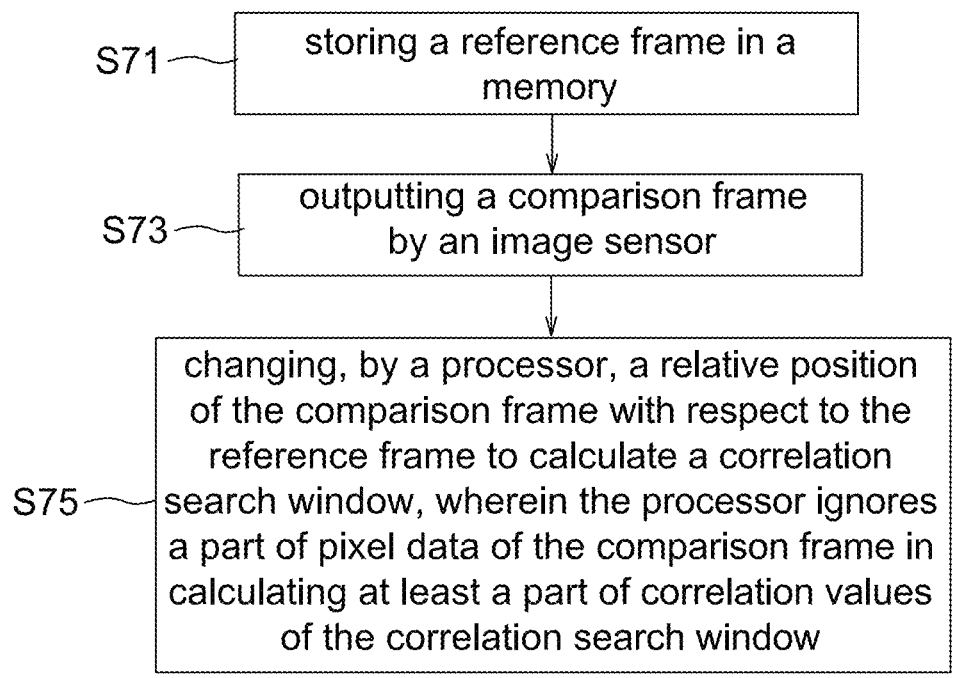
FIG. 7 is a flow chart of an operating method of a navigation device according to one embodiment of the present disclosure.

Referring to FIG. 7, it is a flow chart of an operating method of a navigation device according to one embodiment of the present disclosure, which is adaptable to a calculation method of a correlation search window of a navigation device 100 of FIG. 1. The calculation method includes: storing a reference frame F1 in a memory 17 (Step S71); outputting a comparison frame F2 by an image sensor 13 (Step S73); and changing, by a processor 15, a relative position of the comparison frame F2 with respect to the reference frame F1 to calculate a correlation search window, wherein the processor 15 ignores a part of pixel data of the comparison F2 while calculating at least a part of correlation values of the correlation search window (Step S75). As mentioned above, the comparison frame F2 is a current frame, and the reference frame F1 is an image frame outputted prior to the comparison frame F2.

When the correlation search window is the 3×3 correlation value array (FIG. 2B) or the 5×5 correlation value array (FIG. 4A), the processor 15 ignores a part of pixel data of the comparison frame F2 during calculating each correlation value of the correlation search window.

When the correlation search window is the 5×5 correlation value array (FIG. 5A), the processor 15 does not ignore any pixel data during calculating 9 inner correlation values (e.g., F1 to F9 shown in FIG. 5A) of the correlation value array. However, the processor 15 ignores a part of pixel data of the comparison frame F2 during calculating 16 edge correlation values (e.g., D1-D16 shown in FIG. 5A) of the correlation value array.

As mentioned above, the processor 15 is arranged to calculate or not to calculate the subpixel displacement to accordingly determine whether to re-calculate the correlation values, which are firstly obtained using a partial-resolution comparison frame F2 (e.g., FIG. 3B), by a full-resolution comparison frame F2 (e.g., FIGS. 2C and 2D). For example, when the navigation device 100 has a fast movement, the subpixel motion is not calculated; whereas, when the navigation device 100 has a slow movement, the subpixel motion is calculated to improve the tracking accuracy.

Figure 6:
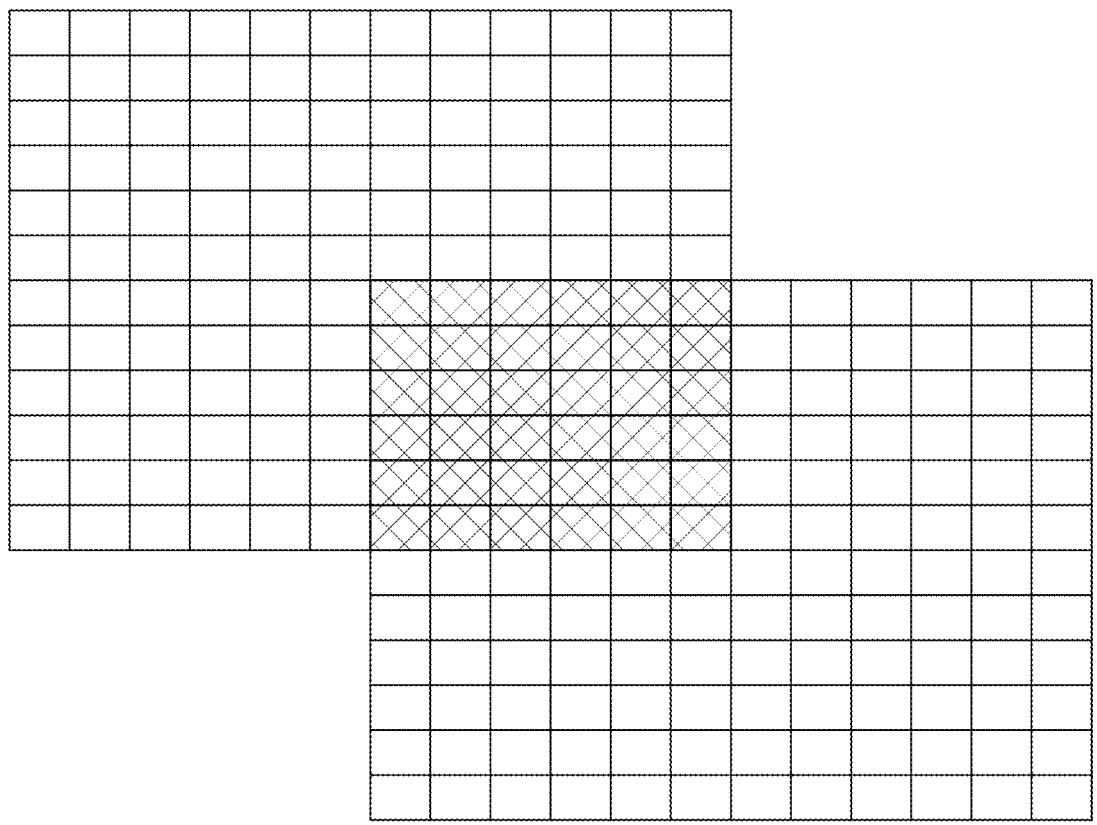
FIG. 6 is a schematic diagram of setting a displacement threshold according to one embodiment of the present disclosure.

In addition, in the fast moving scenario, a moving distance of the navigation device 100 can take a large ratio of the size of the reference frame F1 and the comparison frame F2, as shown in FIG. 6 for example, to cause an overlap area between the reference frame F1 and the comparison frame F2 to be smaller. In this case, if a part of pixel data is ignored in calculating displacement as described in the present disclosure, correct displacement may not be obtainable. Accordingly, in one non-limiting embodiment, the memory 17 further stores a displacement threshold which is previously determined according to a size of a pixel array of the image sensor 13. When the displacement calculated by the processor 15 according to a reference frame F1 and a partial-resolution comparison frame F2 is larger than the displacement threshold, the processor 15 does not ignore any pixel data of a next comparison frame (i.e. an image frame captured by the image sensor 13 after the comparison frame F2) in calculating a next correlation search window. When the displacement calculated by the processor 15 is smaller than the displacement threshold, a power save mode is entered to calculate the correlation search window by the partial-resolution comparison window F2.

Figure 8:
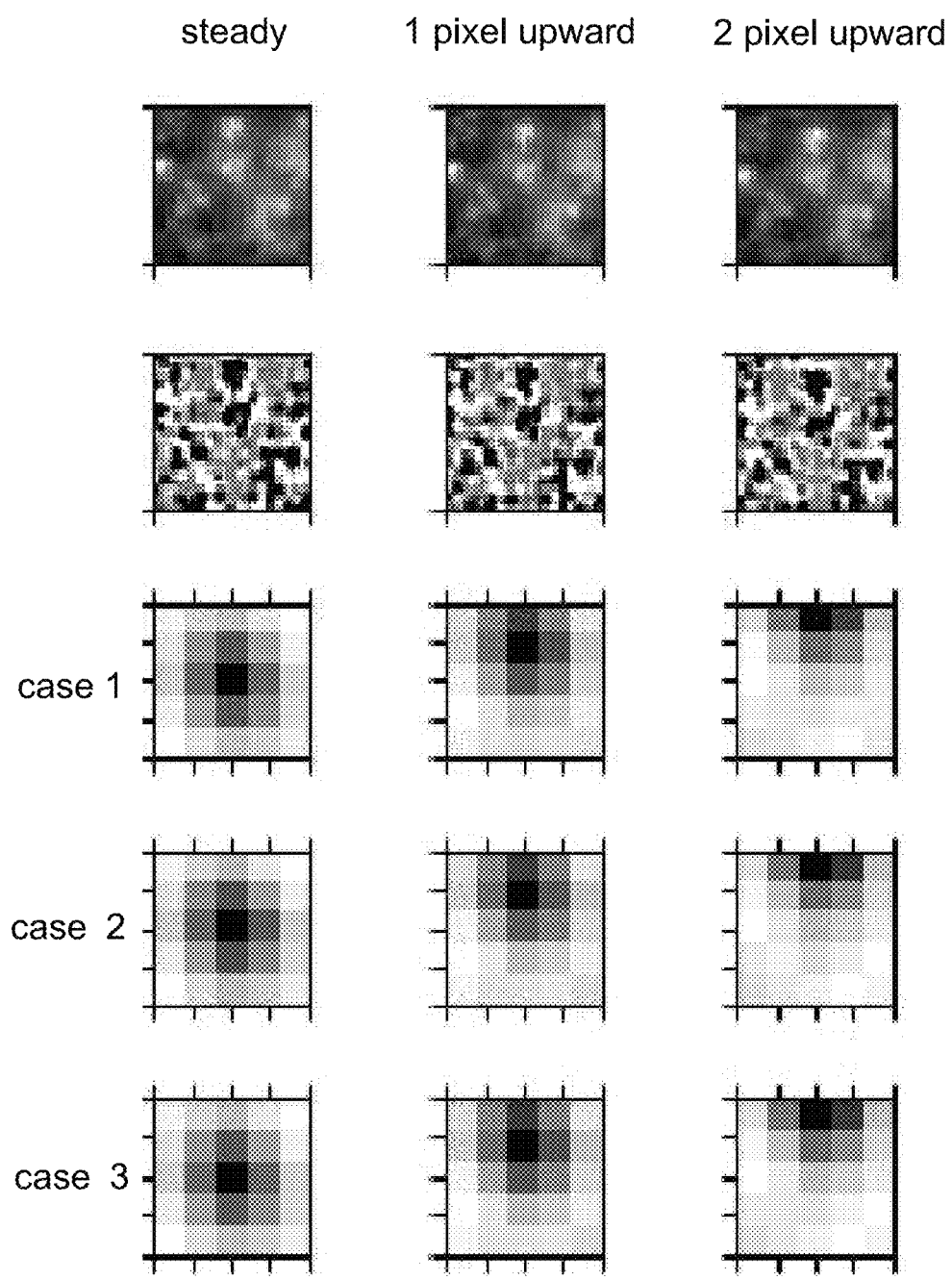
FIG. 8 is a comparison diagram of calculation results between the first, the third and the fourth embodiments of the present disclosure.

FIG. 8 is a schematic diagram of the calculation results of a steady, one pixel upward motion and two pixels upward motion using 5×5 correlation search windows respectively calculated by a full-resolution comparison window of the first embodiment (case 1), as well as by a partial-resolution comparison window of the third embodiment (case 2) and the fourth embodiment (case 3) of the present disclosure. It is clear that the calculation result calculated by the partial-resolution comparison window is not substantially influenced.

It should be mentioned that although the above embodiments are described by ignoring a part of pixel data of the comparison frame as an example, the present disclosure is not limited thereto. In other embodiments, the processor ignores a part of pixel data of the reference frame to reduce the computation load thereof instead of ignoring the pixel data of the comparison frame. The multiplication or subtraction operation between ignored pixels in the reference frame and corresponding pixels in the comparison frame is not calculated by the processor.

As mentioned above, under high speed sampling, the power consumption in performing the position tracking is increased correspondingly. Accordingly, the present disclosure further provides a navigation device (e.g., FIG. 1) and a calculation method of a correlation search window (e.g. FIG. 7) that ignore a part of pixel data during calculating a correlation search window to reduce the computation load (e.g., multiplication or subtraction) of the processor. Not only the power consumption in calculation is reduced, the tracking accuracy will not be degraded. In addition, the subpixel accuracy is obtainable by calculating the correlation values for a second time using a full-resolution image frame.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A navigation device, comprising:
an image sensor configured to output a reference frame and a comparison frame, wherein the comparison frame is a current frame, and the reference frame is an image frame outputted prior to the comparison frame; and
a processor configured to
calculate a correlation search window by changing a relative position of the comparison frame with respect to the reference frame, wherein the processor ignores a part of pixel data of the comparison frame in calculating each correlation value of the correlation search window,
calculate a correlation peak of the correlation search window,
calculate full-resolution correlation values of the correlation peak and adjacent correlation values thereof, respectively, according to the comparison frame without ignoring pixel data and the reference frame, and
mirror project the full-resolution correlation values of the adjacent correlation values within the correlation search window as a part of adjacent correlation values, which are outside the correlation search window, of the correlation peak when the correlation peak is at an edge position of the correlation search window.

2. The navigation device as claimed in claim 1, wherein the ignored pixel data and the rest pixel data in the comparison frame are distributed as a chessboard pattern.

3. The navigation device as claimed in claim 1, wherein the correlation search window is
a 3×3 correlation value array comprising 9 correlation values corresponding to 9 relative positions of the comparison frame with respect to the reference frame, or
a 5×5 correlation value array comprising 25 correlation values corresponding to 25 relative positions of the comparison frame with respect to the reference frame.

4. The navigation device as claimed in claim 3, wherein the each correlation value of the correlation search window is a sum of multiplication or a sum of subtraction between corresponding pixels of the comparison frame and the reference frame at an associated relative position.

5. The navigation device as claimed in claim 1, wherein the processor is further configured to
calculate a displacement according to the correlation peak.

6. The navigation device as claimed in claim 1, wherein the processor is further configured to calculate a subpixel motion according to the correlation peak and the adjacent correlation values thereof in the correlation search window.

7. The navigation device as claimed in claim 5, further comprising a memory configured to store a displacement threshold, wherein
when the displacement is larger than the displacement threshold, the processor is configured not to ignore any pixel data of a next comparison frame while calculating a next correlation search window.

8. A navigation device, comprising:
an image sensor configured to output a reference frame and a comparison frame, wherein the comparison frame is a current frame, and the reference frame is an image frame outputted prior to the comparison frame; and
a processor configured to calculate a 5×5 correlation search window by changing a relative position of the comparison frame with respect to the reference frame, wherein the processor does not ignore any pixel data of the comparison frame while calculating 9 inner correlation values of the correlation search window, but ignores a part of pixel data of the comparison frame while calculating 16 edge correlation values of the correlation search window.

9. The navigation device as claimed in claim 8, wherein the ignored pixel data and the rest pixel data in the comparison frame are distributed as a chessboard pattern.

10. The navigation device as claimed in claim 8, wherein
the 9 inner correlation values of the correlation search window is calculated according to 9 relative positions of the comparison frame with respect to the reference frame, and
the 16 edge correlation values of the correlation search window is calculated according to 16 relative positions of the comparison frame with respect to the reference frame.

11. The navigation device as claimed in claim 10, wherein each correlation value of the correlation search window is a sum of multiplication or a sum of subtraction between corresponding pixels of the comparison frame and the reference frame at an associated relative position.

12. The navigation device as claimed in claim 8, wherein the processor is further configured to
calculate a correlation peak of the correlation search window, and
calculate a displacement according to the correlation peak.

13. The navigation device as claimed in claim 12, wherein the processor is configured to calculate a subpixel motion according to the correlation peak and adjacent correlation values thereof in the correlation search window.

14. The navigation device as claimed in claim 13, wherein when the correlation peak is at a position of the edge correlation values of the correlation search window, the processor is further configured to calculate full-resolution correlation values of the correlation peak and the adjacent correlation values, respectively, according to the comparison frame without ignoring pixel data and the reference frame.

15. The navigation device as claimed in claim 14, wherein the processor is further configured to mirror project the full-resolution correlation values of the adjacent correlation values within the correlation search window as a part of adjacent correlation values, which are outside the correlation search window, of the correlation peak to accordingly calculate the subpixel motion.

16. The navigation device as claimed in claim 13, wherein when the correlation peak is at a position of the inner correlation values of the correlation search window but not at a center position, the processor is further configured to calculate full-resolution correlation values of the adjacent correlation values at positions of the edge correlation values according to the comparison frame without ignoring pixel data and the reference frame to accordingly calculate the subpixel motion.

17. A calculation method of a correlation search window of a navigation device, the navigation device comprising an image sensor, a memory and a processor, the calculation method comprising:

storing a reference frame in the memory;

outputting, by the image sensor, a comparison frame;

calculating, by the processor, a correlation search window by changing a relative position of the comparison frame with respect to the reference frame, wherein the processor ignores a part of pixel data of the comparison frame in calculating at least a part of correlation values of the correlation search window;

not ignoring any pixel data of the comparison frame while calculating inner correlation values of the correlation search window; and ignoring a part of pixel data of the comparison frame while calculating edge correlation values surrounding the inner correlation values of the correlation search window.

18. The calculation method as claimed in claim 17, wherein the correlation search window is a 5×5 correlation value array, and the inner correlation values include 9 correlation values of the correlation search window, and the edge correlation values include 16 correlation values of the correlation search window.

* * * * *